(12) United States Patent
Katoh et al.

(10) Patent No.: US 11,676,030 B2
(45) Date of Patent: Jun. 13, 2023

(54) LEARNING METHOD, LEARNING APPARATUS, AND COMPUTER-READABLE RECORDING MEDIUM

(71) Applicant: FUJITSU LIMITED, Kawasaki (JP)

(72) Inventors: Takashi Katoh, Kawasaki (JP); Kento Uemura, Kawasaki (JP); Suguru Yasutomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 601 days.

(21) Appl. No.: 16/741,839

(22) Filed: Jan. 14, 2020

(65) Prior Publication Data

US 2020/0234139 A1 Jul. 23, 2020

(30) Foreign Application Priority Data

Jan. 17, 2019 (JP) .............................. JP2019-006134

(51) Int. Cl.
*G06N 3/084* (2023.01)
*G06N 20/20* (2019.01)
*G06N 3/045* (2023.01)

(52) U.S. Cl.
CPC ............. *G06N 3/084* (2013.01); *G06N 3/045* (2023.01); *G06N 20/20* (2019.01)

(58) Field of Classification Search
CPC ....... G06N 3/084; G06N 3/0454; G06N 20/20
See application file for complete search history.

(56) References Cited

U.S. PATENT DOCUMENTS

| | | | |
|---|---|---|---|
| 10,388,272 B1* | 8/2019 | Thomson | G06F 40/44 |
| 10,803,357 B2* | 10/2020 | Yasutomi | G06V 10/22 |
| 10,891,516 B2* | 1/2021 | Endoh | G06V 10/40 |
| 11,100,678 B2* | 8/2021 | Yasutomi | G06T 9/002 |
| 2015/0120626 A1* | 4/2015 | Gupta | G06N 3/08 706/20 |
| 2018/0012124 A1 | 1/2018 | Hara et al. | |
| 2018/0130355 A1* | 5/2018 | Zia | G08G 1/0962 |
| 2018/0144214 A1* | 5/2018 | Hsieh | G06T 7/0002 |
| 2018/0157934 A1* | 6/2018 | Hu | G06K 9/6262 |
| 2018/0253865 A1* | 9/2018 | Price | G06T 7/11 |

(Continued)

FOREIGN PATENT DOCUMENTS

GB 2560219 9/2018

OTHER PUBLICATIONS

EESR—Extended European Search Report dated Jun. 16, 2020 for European Patent Application No. 20151397.5.

(Continued)

*Primary Examiner* — Andrae S Allison
(74) *Attorney, Agent, or Firm* — Fujitsu Patent Center (57) ABSTRACT

A learning method executed by a computer, the learning method including augmenting original training data based on non-stored target information included in the original training data to generate a plurality of augmented training data, generating a plurality of intermediate feature values by inputting the plurality of augmented training data to a learning model, and learning a parameter of the learning model such that, with regard to the plurality of intermediate feature values, each of the plurality of intermediate feature values generated from a plurality of augmented training data, augmented from reference training data, becomes similar to a reference feature value.

6 Claims, 10 Drawing Sheets

(56) References Cited

U.S. PATENT DOCUMENTS

| | | | |
|---|---|---|---|
| 2018/0260793 A1* | 9/2018 | Li | G06N 7/005 |
| 2018/0315182 A1 | 11/2018 | Rapaka et al. | |
| 2019/0122120 A1* | 4/2019 | Wu | G06N 3/0472 |
| 2019/0130278 A1 | 5/2019 | Karras et al. | |
| 2019/0171936 A1 | 6/2019 | Karras et al. | |
| 2019/0318260 A1* | 10/2019 | Yasutomi | G06F 17/14 |
| 2020/0175961 A1* | 6/2020 | Thomson | G10L 15/28 |
| 2020/0234140 A1 | 7/2020 | Katoh et al. | |
| 2021/0117868 A1* | 4/2021 | Sriharsha | G06F 16/24568 |

OTHER PUBLICATIONS

Yamamoto, Utako et al., Deformation estimation of an elastic object by partial observation using a neural network, pp. 1-12, arXiv:1711.10157v1 [cs.CV], Nov. 28, 2017.

Tasdizen, Tolga et al., "Appearance invariance in convolutional networks with neighborhood similarity", pp. 1-12, arXiv:1707.00755v1 [cs.CV], Jul. 3, 2017.

Chyros, Grigorios G. et al., "Visual Data Augmentation through Learning", arXiv:1801.06665v1 [cs.CV], pp. 1-9, Jan. 20, 2018.

Epstein, Baruch et al., "Joint auto-encoders: a flexible multi-task learning framework", arXiv:1705.10494v1 [stat.ML], pp. 1-11, May 30, 2017.

Hu, Weihua et al., "Learning Discrete Representations via Information Maximizing Self-Augmented Training", 15 pages, arXiv:1702.08720v3 [stat.ML], Jun. 14, 2017.

Meyer, Matthias et al., "Unsupervised Feature Learning for Audio Analysis", pp. 1-4, arXiv:1712.03835v1 [cs.CV], Workshop track—ICLR 2017, Dec. 11, 2017.

Zhu, Xinyue et al., "Emotion Classification with Data Augmentation Using Generative Adversarial Networks", arXiv:1711.00648v5 [cs.CV], 14 pages, Dec. 14, 2017.

Su, Yu et al. "Cross-domain Semantic Parsing via Paraphrasing", arXiv:1704.05974v2 [cs.CL], pp. 12 pages, Jul. 24, 2017.

USPTO—Non-Final Office Action dated Jun. 9, 2022 for U.S. Appl. No. 16/741,860 [pending].

EPOA—Office Action dated Feb. 1, 2023 for European Patent Application No. 20151397.5.

Adil Khan, et al. "Post-training Iterative Hierarchical Data Augmentation for Deep Networks", Advances in Neural Information Processing Systems 33 (2020); 689-699. (Year: 2020). [cited in NOA filed herewith].

Jason Wang and Luis Perez;" The Effectiveness of Data Augmentation in Image Classification using Deep Learning" Stanford University Research Report, 2017. [cited in NOA filed herewith].

USPTO—Notice of Allowance dated Nov. 22, 2022 for related U.S. Appl. No. 16/741,860 [allowed].

* cited by examiner

| DATA NUMBER | TRAINING DATA | CORRECT LABEL | NON-STORED TARGET TYPE |
|---|---|---|---|
| p001 | x1 | y1 | LICENSE PLATE |
| p002 | x2 | y2 | FACE IMAGE |
| p003 | x3 | y3 | TERMINAL SCREEN |
| ... | ... | ... | ... |

FIG.5

| DATA NUMBER | AUGMENTED TRAINING DATA | CORRECT LABEL |
|---|---|---|
| p001 | x1.1, x1.2, x1.3 | y1 |
| p002 | x2.1, x2.2, x2.3 | y2 |
| p003 | x3.1, x3.2, x3.3 | y3 |
| ... | ... | ... |

FIG.6

| IDENTIFICATION INFORMATION | PARAMETER |
|---|---|
| FIRST NN | $\theta 1$ |
| SECOND NN | $\theta 2$ |
| ... | ... |

| DATA NUMBER | REFERENCE FEATURE VALUE | CORRECT LABEL |
|---|---|---|
| p001 | zP1 | yP1 |
| p002 | zP2 | yP2 |
| p003 | zP3 | yP3 |
| ... | ... | ... |

LEARNING METHOD, LEARNING APPARATUS, AND COMPUTER-READABLE RECORDING MEDIUM

CROSS-REFERENCE TO RELATED APPLICATION

This application is based upon and claims the benefit of priority of the prior Japanese Patent Application No. 2019-006134, filed on Jan. 17, 2019, the entire contents of which are incorporated herein by reference.

FIELD

The embodiments discussed herein are related to a learning method, and the like.

BACKGROUND

To learn a deep learning model, the amount of training data (learning data) is a factor that largely contributes to a performance, and it is preferable that there is a larger amount of training data. If the amount of training data is insufficient and the type of application data, which does not exist in the training data, is applied to the deep learning model that has been learned with the training data, it is difficult to obtain an appropriate output result and there is a higher possibility of a failure.

In the field of business using customer data, it is difficult to store certain customer data on a permanent basis or share it for the task of a different customer, or the like, in consideration of contracts or information leakage risks; therefore, the amount of training data may be insufficient.

If the amount of training data is insufficient, data augmentation is typically executed. The data augmentation is processing performed on original training data, e.g., the addition of noise, parallel displacement, or deletion, so as to expand the range of the training data to the range of the application data.

Here, there is a background art in which original training data is input to a deep learning model and an obtained intermediate feature value is stored so that, without storing the original training data, the amount of data usable for learning a new deep learning model may be increased.

Figure 12:
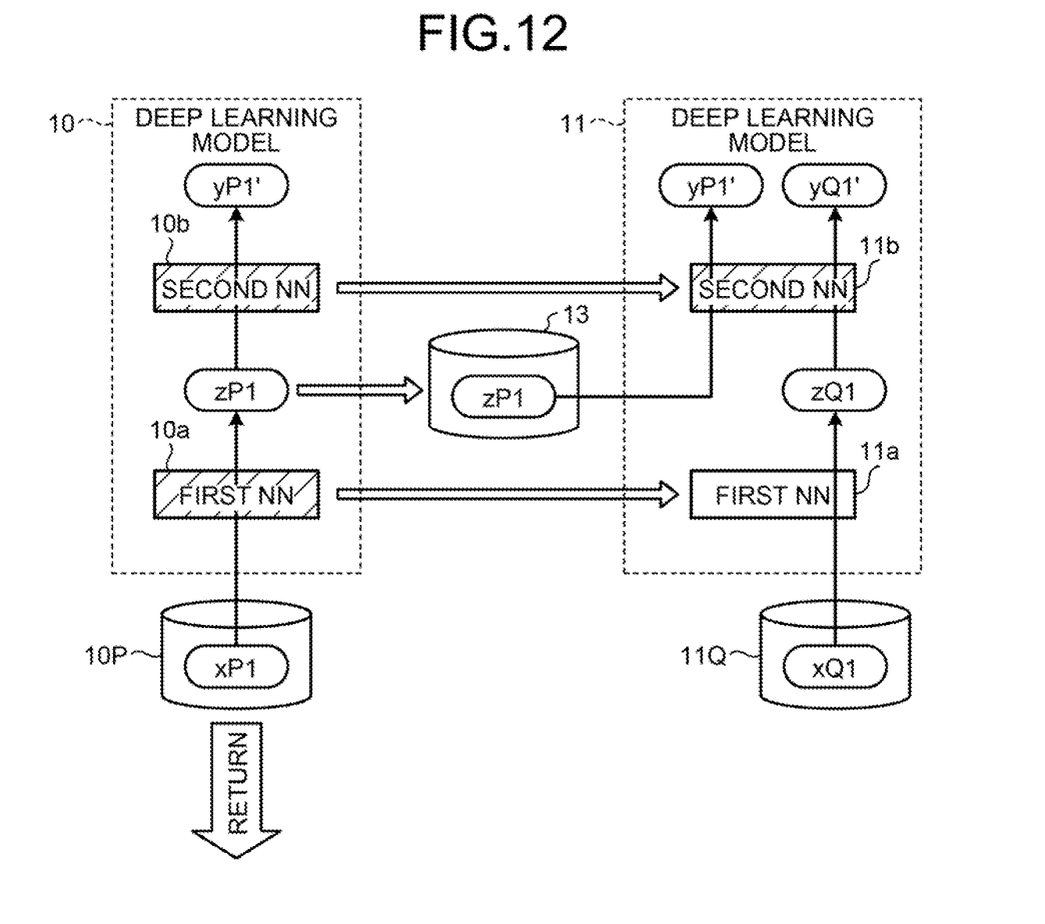
FIG. 12 is a diagram that illustrates a background art.

FIG. 12 is a diagram that illustrates the background art. In FIG. 12, a deep learning model 10 includes a first NN (Neural Network) 10a and a second NN 10b. The first NN 10a is an NN that calculates an intermediate feature value when training data is input. The second NN 10b is an NN that calculates an output label when an intermediate feature value is input. The parameters of the first NN 10a and the second NN 10b have been learned by using a plurality of sets of training data on a customer P stored in a database 10P. After the learning is finished, the information in the database 10P is returned (or discarded) to the customer P.

For example, when training data xP1 is input to the first NN 10a, an intermediate feature value zP1 is calculated. When the intermediate feature value zP1 is input to the second NN 10b, an output label yP1' is calculated. According to the background art, before the information in the database 10P is returned, the intermediate feature value zP1, calculated from the training data xP1, is stored in a database 13. According to the background art, an intermediate feature value calculated from different training data and stored in the database 10P is also stored in the database 13.

Then, according to the background art, a new deep learning model 11 is learned (sequential learning) by using the database 13 and a database 11Q that stores a plurality of sets of training data on a customer Q. The deep learning model 11 includes a first NN 11a and a second NN 11b. According to the background art, the learned parameter of the first NN 10a is set as the parameter of the first NN 11a In the background art, the learned parameter of the second NN 10b is set as the parameter of the second NN 11b.

For example, when training data xQ1 in the database 11Q is input to the first NN 11a, an intermediate feature value zQ1 is calculated. When the intermediate feature value zQ1 is input to the second NN 11b, an output label yQ1' is calculated. According to the background art, the parameter of the second NN 11b is learned such that the output label yQ1' becomes close to the correct label (not illustrated).

When the intermediate feature value zP1 in the database 13 is input to the second NN 11b, the output label yP1' is calculated. According to the background art, the parameter of the second NN 11b is learned such that the output label yP1' becomes close to the correct label (not illustrated).

As described above, in the background art, to learn the parameter of the second NN 11b, the learning is executed by using an intermediate feature value in the database 13 in addition to the intermediate feature value calculated from the training data in the database 11Q. Therefore, even though the information in the database 10P is returned (discarded) to the customer P, it is possible to increase the amount of data usable during the learning of a new deep learning model.

Non-patent Document 1: Utako Yamamoto et al. "Deformation estimation of an elastic object by partial observation using a neural network"

The intermediate feature value generated from original training data may include undesired information that is included in the training data and is irrelevant to the intended purpose. For example, the undesired information that is irrelevant to the intended purpose includes personal information, and there is a demand to delete the personal information in consideration of the risk of information leakage.

As the personal information corresponds to various things, such as a face image, a license plate, a screen that is being viewed by a user, it is difficult for a computer to automatically determine and delete the personal information from intermediate feature values. Furthermore, it is possible that a user refers to the guideline defining the personal information that is the target to be deleted so as to delete the personal information from intermediate feature values. However, in a case where there is a large amount of data for intermediate feature values, there is a large burden on the user when the user checks the intermediate feature values one by one.

Conversely, if the learning is executed without storing intermediate feature values in the database 13, the amount of training data may be insufficient, and the accuracy with which the deep learning model is learned is degraded.

SUMMARY

According to an aspect of the embodiments, a learning method executed by a computer includes: augmenting original training data based on non-stored target information included in the original training data to generate a plurality of augmented training data; generating a plurality of intermediate feature values by inputting the plurality of augmented training data to a learning model; and learning a parameter of the learning model such that, with regard to the plurality of intermediate feature values, each of the plurality of intermediate feature values generated from a plurality of augmented training data, augmented from reference training data, becomes similar to a reference feature value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The present invention is not limited to the embodiment.

Figure 1:
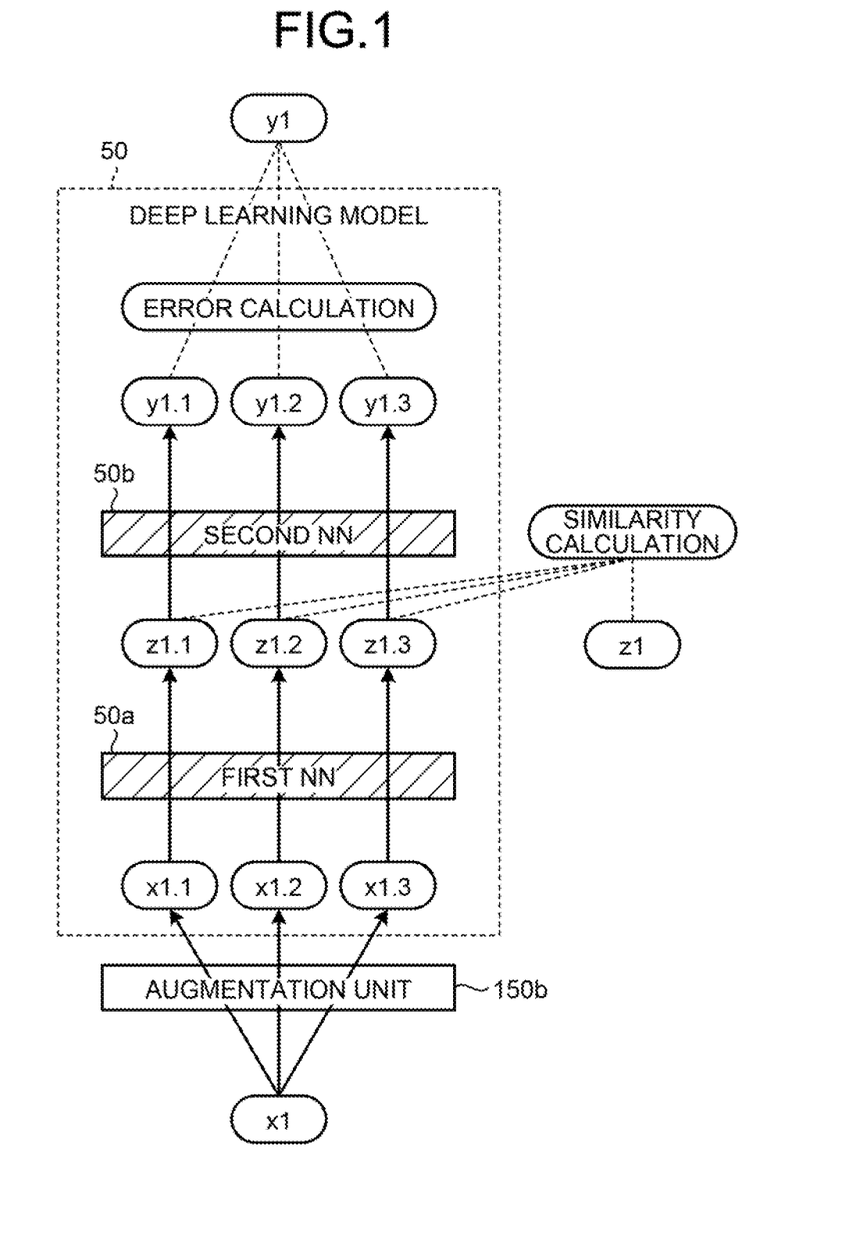
FIG. 1 is a diagram that illustrates a process of a learning apparatus according to the present embodiment.

FIG. 1 is a diagram that illustrates a process of a learning apparatus according to the present embodiment. As illustrated in FIG. 1, the learning apparatus includes an augmentation unit $150b$. The augmentation unit $150b$ augments original training data x1 to generate sets of training data x1.1, x1.2, and x1.3. The learning apparatus inputs the sets of training data x1.1 to x1.3 to a deep learning model 50.

The deep learning model 50 includes a first NN $50a$ and a second NN $50b$. The first NN $50a$ is an NN that calculates an intermediate feature value when training data is input. The second NN $50b$ is an NN that calculates an output label when an intermediate feature value is input.

For example, the learning apparatus inputs the sets of training data x1.1, x1.2, and x1.3 to the first NN $50a$ to calculate intermediate feature values z1.1, z1.2, and z1.3. The learning apparatus inputs the intermediate feature values z1.1, z1.2, and z1.3 to the second NN $50b$ to calculate output labels y1.1, y1.2, and y1.3.

The learning apparatus calculates the error between the output label y1.1 and a correct label y1 for the training data x1. The learning apparatus calculates the error between the output label y1.2 and the correct label y1. The learning apparatus calculates the error between the output label y1.3 and the correct label y1. The learning apparatus learns a parameter of the first NN $50a$ and a parameter of the second NN $50b$ by using the error back propagation algorithm so as to reduce the error.

The learning apparatus calculates the degree of similarity between the intermediate feature value z1.1 and a reference feature value z1 for the training data x1. The learning apparatus calculates the degree of similarity between the intermediate feature value z1.2 and the reference feature value z1. The learning apparatus calculates the degree of similarity between the intermediate feature value z1.3 and the reference feature value z1. The learning apparatus learns a parameter of the first NN $50a$ and the reference feature value z1 by using the error back propagation algorithm so as to increase the degree of similarity.

Figure 2:
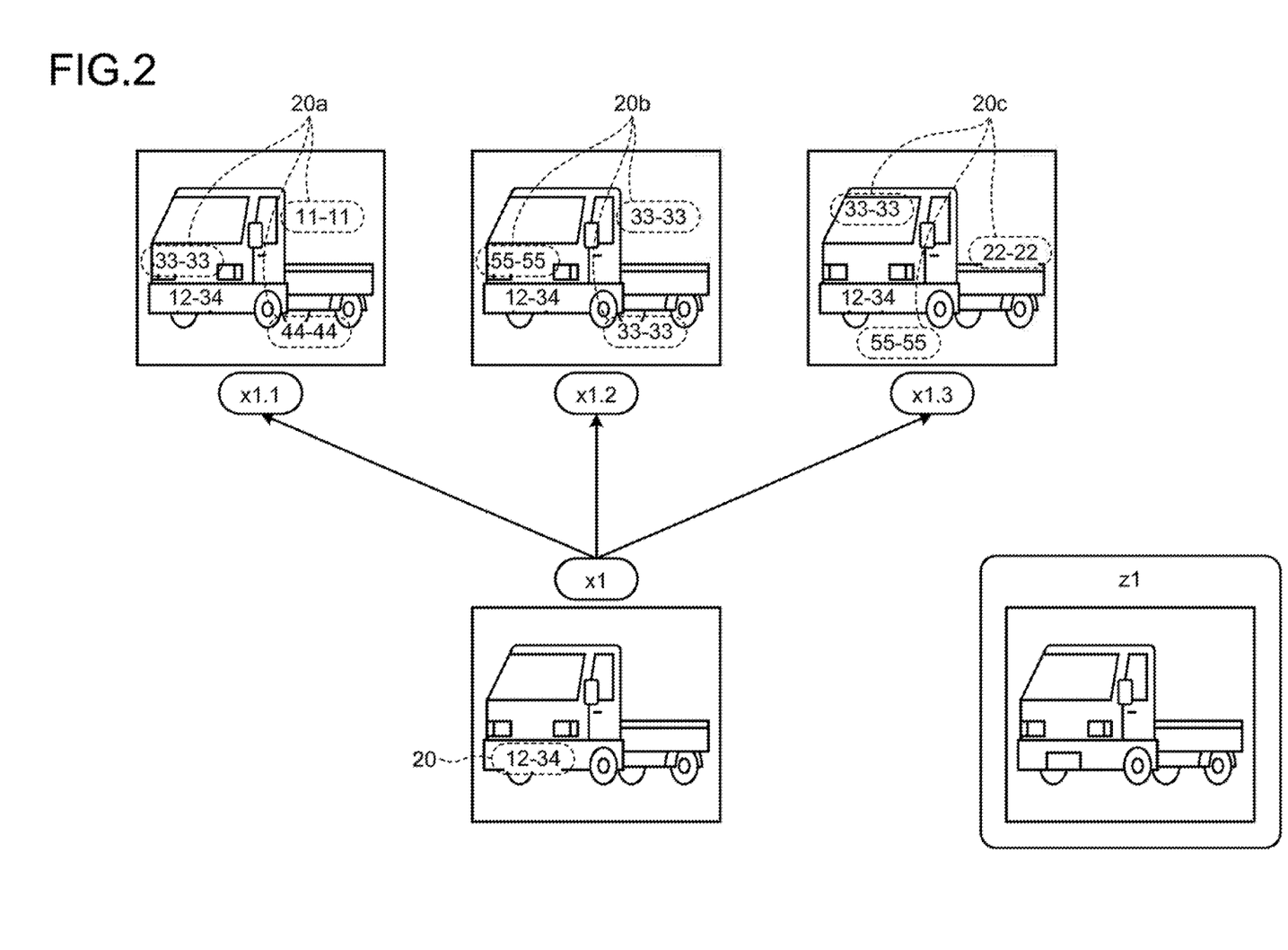
FIG. 2 is a diagram that illustrates a process of an augmentation unit according to the present embodiment.

FIG. 2 is a diagram that illustrates a process of the augmentation unit according to the present embodiment. The augmentation unit $150b$ executes data augmentation based on non-stored target information included in original training data to generate a plurality of sets of training data. The non-stored target information is the information with which an individual person is identifiable. In the description with reference to FIG. 2, the "license plate" of a vehicle is used as the non-stored target information. The non-stored target information may be a face image, a terminal screen, or the like, as well as a license plate.

In the example illustrated in FIG. 2, the original training data x1 includes non-stored target information 20. The augmentation unit $150b$ generates a plurality of sets of dummy information based on the non-stored target information 20. The augmentation unit $150b$ adds dummy information to the training data x1 to generate the sets of training data x1.1, x1.2, and x1.3. Each set of dummy information illustrated in FIG. 2 is the information obtained by replacing all or part of the license plate number, which is the non-stored target information 20, with a different number.

For example, the augmentation unit $150b$ adds (data augmentation) dummy information $20a$ to the training data x1 to generate the training data x1.1. The augmentation unit $150b$ adds (data augmentation) dummy information $20b$ to the training data x1 to generate the training data x1.2. The augmentation unit $150b$ adds (data augmentation) dummy information $20c$ to the training data x1 to generate the training data x1.3.

After the sets of training data x1.1 to x1.3, augmented during the process of the augmentation unit $150b$ as described in FIG. 2, are input to the deep learning model 50, the learning is executed such that the intermediate feature values z1.1 to z1.3 become similar to the reference feature value z1, as described in FIG. 1. Thus, as the learning is executed so as to cancel the dummy information for the data augmentation and the non-stored target information, the reference feature value z1 is learned so as not to include the non-stored target information. FIG. 2 illustrates an example of the learned reference feature value z1. The reference feature value z1 does not include the non-stored target information 20.

As described above, the learning apparatus executes data augmentation by adding dummy information, which is similar to the non-stored target information, to the original training data to generate a plurality of sets of training data. The learning apparatus learns the parameter of the deep learning model and the reference feature value such that the intermediate feature values of the sets of training data become similar to the reference feature value and the output labels become close to the correct label. The learned reference feature value includes no non-stored target information. This prevents inappropriate information from remaining when the reference feature value is continuously used for the subsequent sequential learning.

Figure 3:
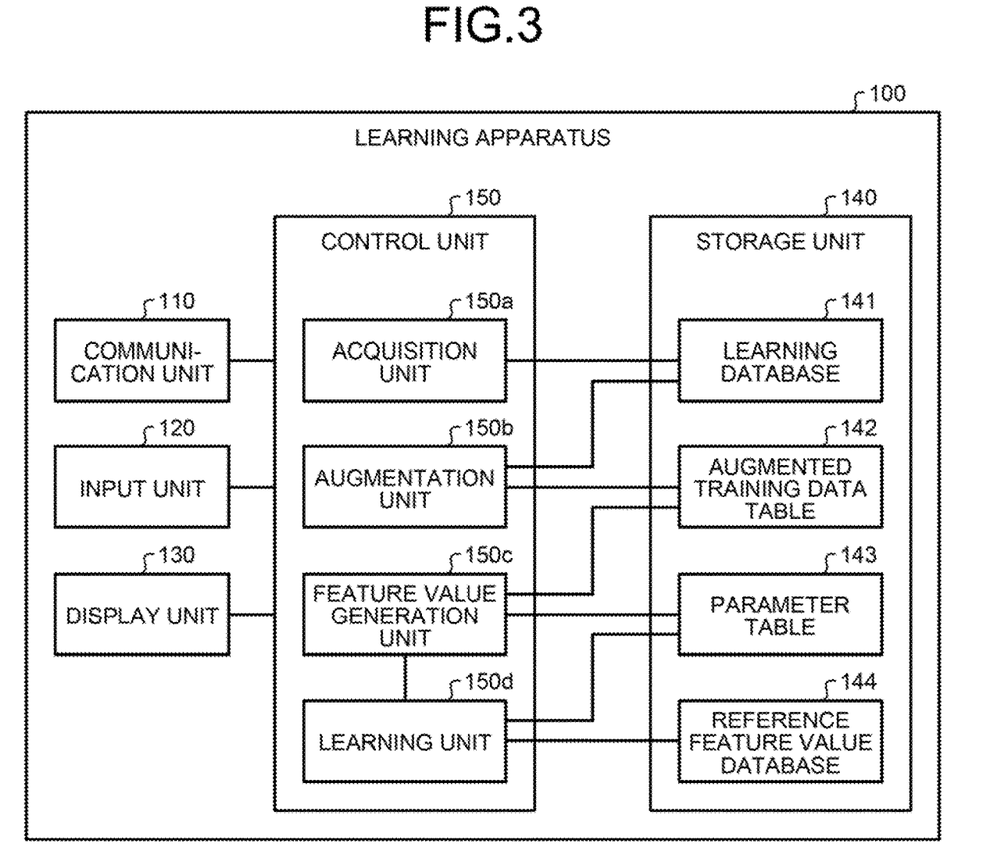
FIG. 3 is a functional block diagram that illustrates a configuration of the learning apparatus according to the present embodiment.

Next, an example of the configuration of the learning apparatus according to the present embodiment is described. FIG. 3 is a functional block diagram that illustrates a configuration of the learning apparatus according to the present embodiment. As illustrated in FIG. 3, a learning apparatus 100 includes a communication unit 110, an input unit 120, a display unit 130, a storage unit 140, and a control unit 150.

The communication unit 110 is a processing unit that performs data communication with an external device (not illustrated) via a network, or the like. The communication unit 110 corresponds to a communication device. For example, the communication unit 110 receives information in a learning database 141 described later from an external device, or the like, of each customer. The control unit 150 described later communicates data with an external device via the communication unit 110.

The input unit 120 is an input device to input various types of information to the learning apparatus 100. For example, the input unit 120 corresponds to a keyboard, a mouse, a touch panel, etc.

The display unit 130 is a display device that displays various types of information output from the control unit 150. For example, the display unit 130 corresponds to a liquid crystal display, a touch panel, etc.

The storage unit 140 includes the learning database 141, an augmented training data table 142, a parameter table 143, and a reference feature value database 144. The storage unit 140 corresponds to a semiconductor memory device such as a RAM (random access memory), a ROM (read only memory), or a flash memory, or a storage device such as an HDD (hard disk drive).

Figure 4:
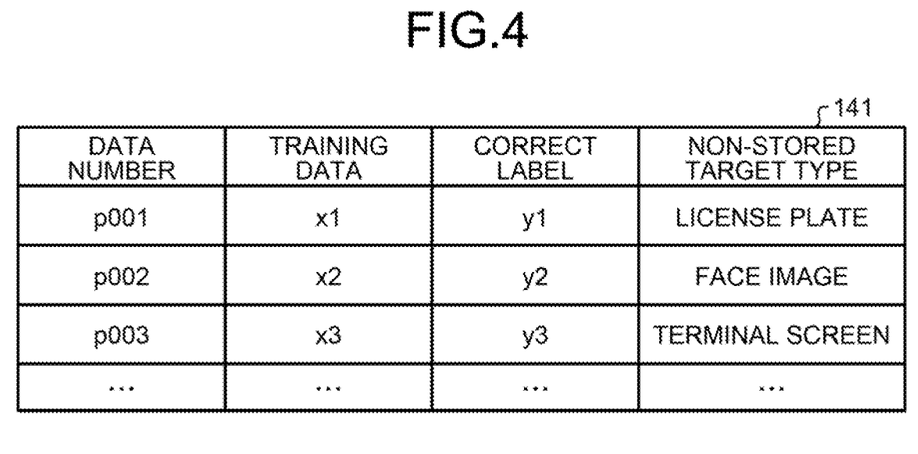
FIG. 4 is a table that illustrates an example of the data structure of a learning database according to the present embodiment.

The learning database 141 stores information on the training data notified from a customer. FIG. 4 is a table that illustrates an example of the data structure of the learning database according to the present embodiment. As illustrated in FIG. 4, the learning database 141 contains a data number, training data, a correct label, and a non-stored target type. The data number is the number for uniquely identifying original training data. For example, the correct label "y1" corresponds to the training data "x1", and the training data "x1" has a data number "p001". The non-stored target type indicates the type of personal information that is non-stored target information.

For example, in a case where the non-stored target information included in the training data is the information on the license plate of a vehicle, the non-stored target type is "license plate". In a case where the non-stored target information included in the training data is the information on the personal face image, the non-stored target type is "face image". In a case where the non-stored target information included in the training data is the information on the terminal screen of a personal computer, a smartphone, or the like, of an individual person, the non-stored target type is "terminal screen".

Figure 5:
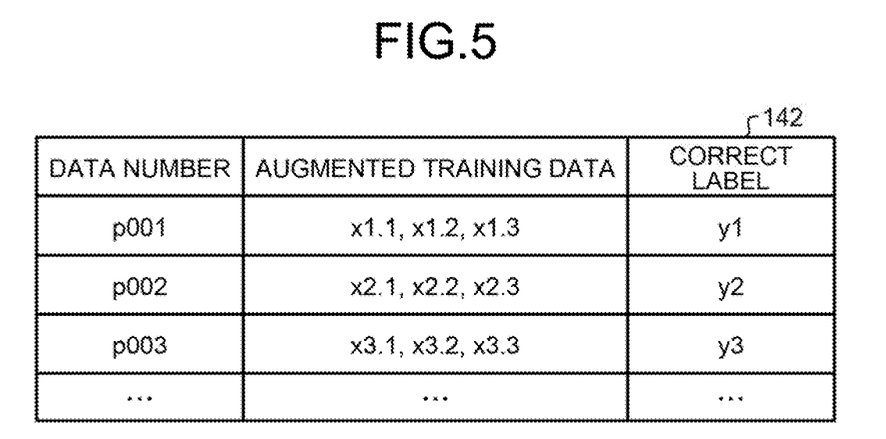
FIG. 5 is a table that illustrates an example of the data structure of an augmented training data table according to the present embodiment.

The augmented training data table 142 is a table that stores training data that is augmented based on original training data. FIG. 5 is a table that illustrates an example of the data structure of the augmented training data table according to the present embodiment. As illustrated in FIG. 5, the augmented training data table 142 relates a data number, augmented training data, and a correct label. The data number is the number for uniquely identifying the original training data based on which data augmentation is executed. The correct label corresponding to the augmented training data is the correct label related to the original training data corresponding to the data number.

Figure 6:
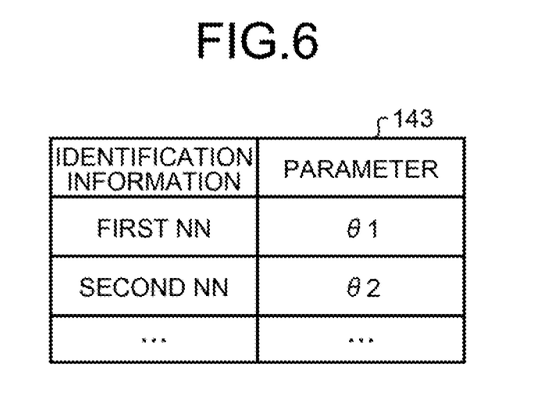
FIG. 6 is a table that illustrates an example of the data structure of a parameter table according to the present embodiment.

The parameter table 143 is a table that stores a parameter of the first NN 50a and a parameter of the second NN 50b. FIG. 6 is a table that illustrates an example of the data structure of a parameter table according to the present embodiment. As illustrated in FIG. 6, the parameter table 143 relates identification information and a parameter. The identification information is the information for identifying each NN. The parameter is the parameter set in each NN. The structure is such that an NN includes a plurality of layers, each layer includes a plurality of nodes, and each node is connected with an edge. Each layer has a function called an activation function and a bias value, and an edge has a weight. As is the case with an NN, the structure is such that a decoder includes a plurality of layers, each layer includes a plurality of nodes, and each node is connected with an edge. According to the present embodiment, a bias value, a weight, and the like, set in an NN are collectively described as "parameter".

Figure 7:
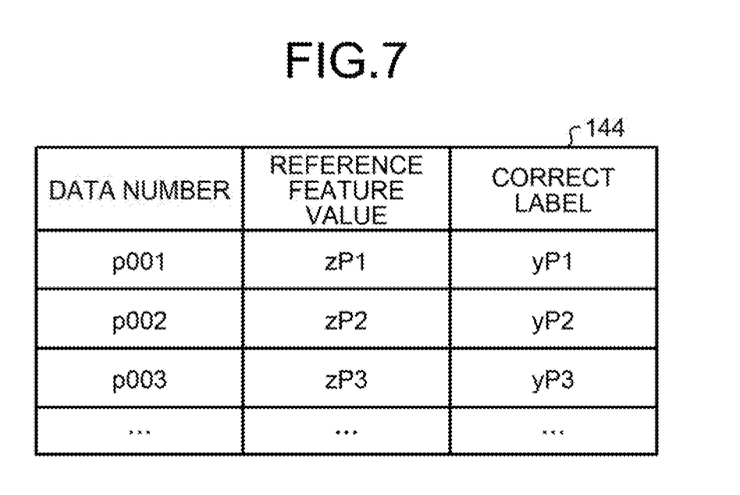
FIG. 7 is a table that illustrates an example of the data structure of a reference feature value database according to the present embodiment.

The reference feature value database 144 is a database that stores the reference feature value set for each set of original training data. FIG. 7 is a table that illustrates an example of the data structure of a reference feature value database according to the present embodiment. As illustrated in FIG. 7, the reference feature value database 144 relates a data number, a reference feature value, and a correct label. The data number is the number for uniquely identifying original training data. The default value of the reference feature value is previously set. The correct label is the correct label for the original training data corresponding to the data number.

With reference back to FIG. 3, the control unit 150 includes an acquisition unit 150a, the augmentation unit 150b, a feature value generation unit 150c, and a learning unit 150d. The control unit 150 may be implemented by using a CPU (central processing unit) or an MPU (micro processing unit). The control unit 150 may be also implemented by using a hard-wired logic such as an ASIC (application specific integrated circuit) or an FPGA (field programmable gate array).

The acquisition unit 150a is a processing unit that acquires the information on the learning database 141 from an external device, or the like, of each customer. The acquisition unit 150a stores the acquired information on the learning database 141 in the learning database 141.

The augmentation unit 150b is a processing unit that executes data augmentation on original training data stored in the learning database 141 to generate a plurality of sets of training data.

In a case where original training data is acquired from the learning database 141, the augmentation unit 150b refers to the non-stored target type corresponding to the training data and generates a plurality of sets of dummy information corresponding to the non-stored target type. The augmentation unit 150b performs the process to add dummy information to the training data to generate a plurality of sets of training data.

In a case where the non-stored target type is "license plate", the augmentation unit 150b acquires the template data (not illustrated) on the license plate and sets a random number in the template data to generate a plurality of sets of dummy information. For example, the storage unit 140 previously stores template data. Alternatively, the augmentation unit 150b executes the matching between the training data and the template defining the shape of the license plate to detect the license plate from the training data. The augmentation unit 150b may replace all or part of the detected license plate number with a different number to generate dummy information.

In a case where the non-stored target type is "face image", the augmentation unit 150b acquires a face image table (not illustrated) and uses, as dummy information, multiple face images set in the face image table (not illustrated). For example, the storage unit 140 previously stores the face image table. Alternatively, the augmentation unit 150b may execute the matching between the training data and the template defining the characteristics of the face to detect the face image from the training data. The augmentation unit 150b may replace all or part of the detected face image with a different face image to generate dummy information. The augmentation unit 150b may acquire a different face image from the face image table.

In a case where the non-stored target type is "terminal screen", the augmentation unit 150b acquires a screen table (not illustrated) and uses, as dummy information, multiple terminal screens set in the screen table (not illustrated). For example, the storage unit 140 previously stores the screen table. Alternatively, the augmentation unit 150b may execute the matching between the training data and the template defining the characteristics of the terminal screen to detect the terminal screen from the training data. The augmentation unit 150b may replace all or part of the detected terminal screen with a different terminal screen to generate dummy information. The augmentation unit 150b may acquire a different terminal screen from the screen table.

The augmentation unit 150b stores the data number of original training data, augmented training data, and the correct label corresponding to the original training data in the augmented training data table 142 in a related manner. The augmentation unit 150b repeatedly performs the above-described process on each set of training data stored in the learning database 141.

The feature value generation unit 150c is a processing unit that inputs a plurality of sets of augmented training data to the first NN 50a and generates an intermediate feature value for each of the sets of training data. An example of the process of the feature value generation unit 150c is described below.

The feature value generation unit 150c executes the first NN 50a and sets a parameter θ1 stored in the parameter table 143 as the parameter of the first NN 50a. The feature value generation unit 150c acquires the data numbers and the plurality of sets of training data associated with the data numbers from the augmented training data table 142 and sequentially inputs the acquired sets of training data to the first NN 50a. The feature value generation unit 150c uses the parameter θ1 set in the first NN 50a to calculate the intermediate feature value for each of the sets of training data.

The feature value generation unit 150c acquires the reference feature value from the reference feature value database 144 and calculates the square error between the reference feature value and the intermediate feature value corresponding to the training data. The reference feature value, which is compared with the intermediate feature value, is the reference feature value corresponding to the original training data based on which data is augmented. Based on the description with reference to FIG. 1, the reference feature value, which is compared with the intermediate feature values z1.1 to z1.3, is the reference feature value z1 corresponding to the training data x1. The feature value generation unit 150c outputs the intermediate feature value, the data number, and the information on the square error to the learning unit 150d.

The feature value generation unit 150c repeatedly performs the process to acquire augmented training data from the augmented training data table 142 and calculate an intermediate feature value, the process to calculate the information on the square error, and the process to output the intermediate feature value, the data number, the information on the square error to the learning unit 150d.

The learning unit 150d is a processing unit that learns the parameters of the first NN 50a and the second NN 50b. A process of the learning unit 150d is described below. The learning unit 150d executes the first NN 50a and sets the parameter θ1 stored in the parameter table 143 as the parameter of the first NN 50a. The learning unit 150d executes the second NN 50b and sets the parameter θ2 stored in the parameter table 143 as the parameter of the second NN 50b.

The learning unit 150d inputs the intermediate feature value acquired from the feature value generation unit 150c to the second NN 50b. The learning unit 150d uses the parameter θ2 set in the second NN to calculate an output label.

Figure 8:
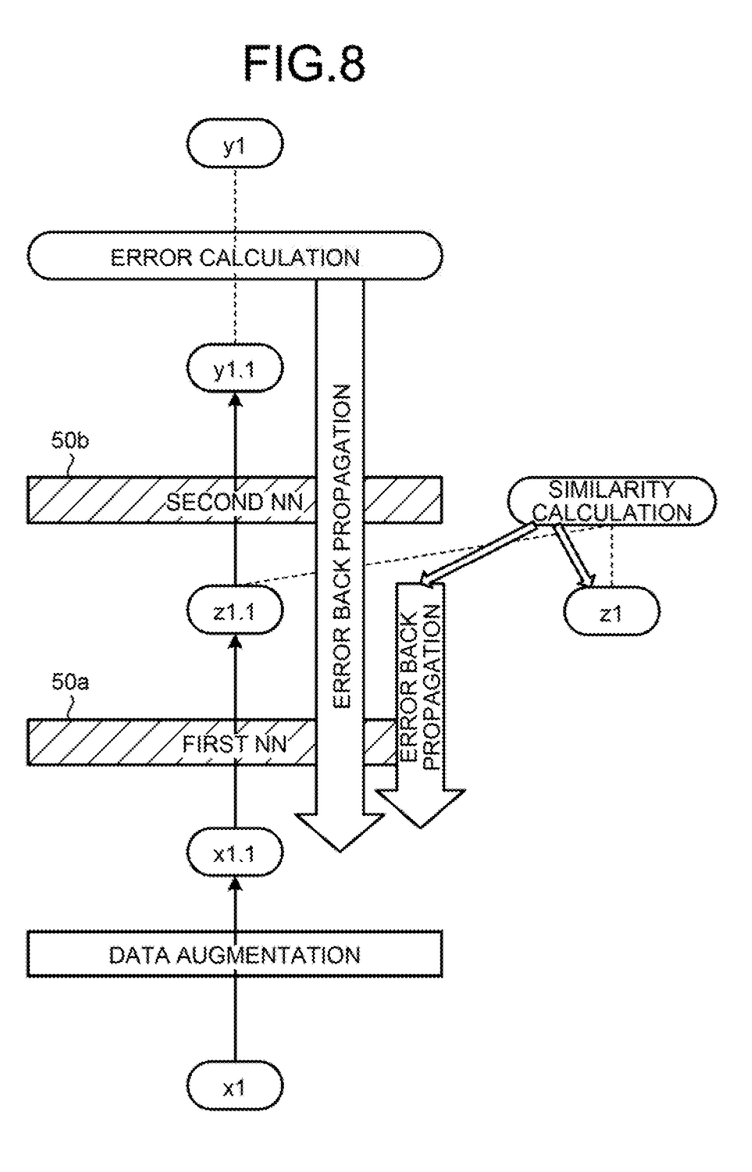
FIG. 8 is a diagram that illustrates a process of a learning unit according to the present embodiment.

FIG. 8 is a diagram that illustrates a process of the learning unit according to the present embodiment. For example, the learning unit 150d inputs the intermediate feature value z1.1 to the second NN 50b and calculates the output label y1.1. The learning unit 150d learns the parameter θ1 of the first NN 50a and the parameter θ2 of the second NN 50b such that the output label y1.1 and the correct label y1 become close to each other in accordance with the error back propagation algorithm. The learning unit 150d learns the parameter θ1 of the first NN 50a and the reference feature value z1 such that the square error between the intermediate feature value z1.1 and the reference feature value z1 become smaller. The learning unit 150d repeatedly performs the above-described process each time the intermediate feature value, the data number, and the information on the square error are acquired from the feature value generation unit 150c.

The learning unit 150d updates the parameters θ1 and θ2 in the parameter table 143 with the learned parameters 91 and 02. The learning unit 150d updates the reference feature value in the reference feature value database 144 with the learned reference feature value. The reference feature value to be updated is the reference feature value corresponding to the data number acquired from the feature value generation unit 150c.

That is, the learning unit 150d learns the parameters θ1 and θ2 of the first NN 50a and the second NN 50b and the reference feature value such that the error between the output label and the correct label is decreased and the degree of similarity between the intermediate feature value and the reference feature value is increased. A decrease in the square error between the intermediate feature value and the reference feature value means an increase in the degree of similarity between the intermediate feature value and the reference feature value.

Figure 9:
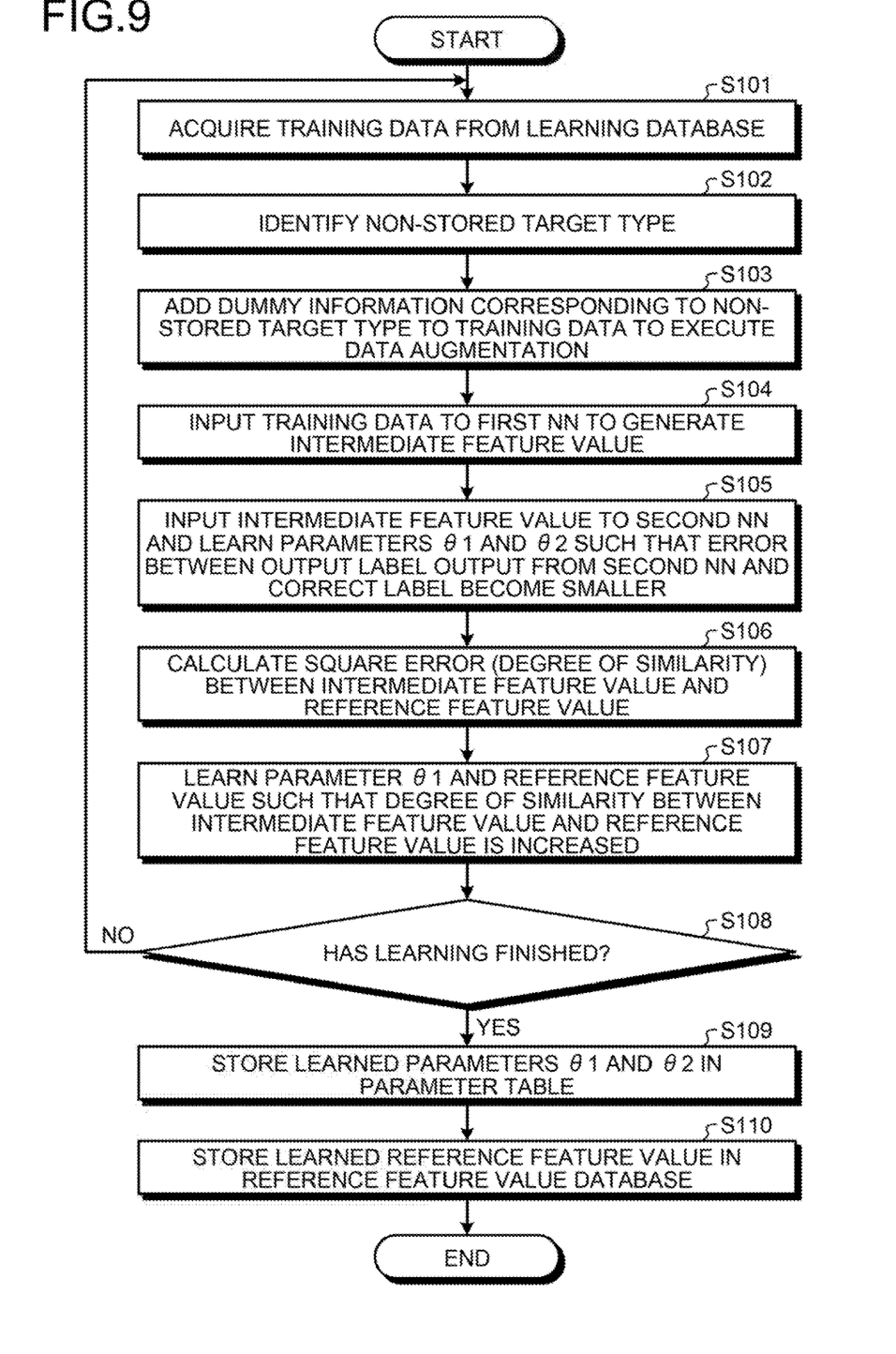
FIG. 9 is a flowchart that illustrates the steps of a process of the learning apparatus according to the present embodiment.

Next, an example of the steps of the process of the learning apparatus 100 according to the present embodiment is described. FIG. 9 is a flowchart that illustrates the steps of the process of the learning apparatus according to the present embodiment. As illustrated in FIG. 9, the augmentation unit 150b of the learning apparatus 100 acquires training data from the learning database 141 (Step S101).

The augmentation unit 150b identifies the non-stored target type corresponding to the training data (Step S102). The augmentation unit 150b adds dummy information corresponding to the non-stored target type to the training data to execute data augmentation (Step S103).

The feature value generation unit 150c of the learning apparatus 100 inputs the training data to the first NN 50a to generate an intermediate feature value (Step S104). The learning unit 150d of the learning apparatus 100 inputs the intermediate feature value to the second NN 50b and learns the parameters θ1 and θ2 such that the error between the output label output from the second NN 50b and the correct label become smaller (Step S105).

The feature value generation unit 150c calculates the square error (the degree of similarity) between the intermediate feature value and the reference feature value (Step S106). The learning unit 150d learns the parameter θ1 and the reference feature value such that the degree of similarity between the intermediate feature value and the reference feature value is increased (Step S107).

When the learning has not finished (Step S108, No), the learning apparatus 100 proceeds to Step S101. Conversely, when the learning has finished (Step S108, Yes), the learning apparatus 100 stores the learned parameters θ1 and θ2 in the parameter table 143d (Step S109). The learning apparatus 100 stores the learned reference feature value in the reference feature value database 144 (Step S110).

The learning apparatus 100 may cause the display unit 130 to display the learned parameters θ1 and θ2 stored in the parameter table 143 or may notify the information on the parameters θ1 and θ2 to a determination device that makes various determinations by using the parameters θ1 and θ2.

When new training data information on a customer is stored in the learning database 141, the learning apparatus 100 learns the parameter θ2 of the second NN 50b based on the new training data and the correct label in the learning database 141. The learning apparatus 100 learns the parameter θ2 of the second NN 50b based on the reference feature value and the correct label stored in the reference feature value database 144.

Figure 10:
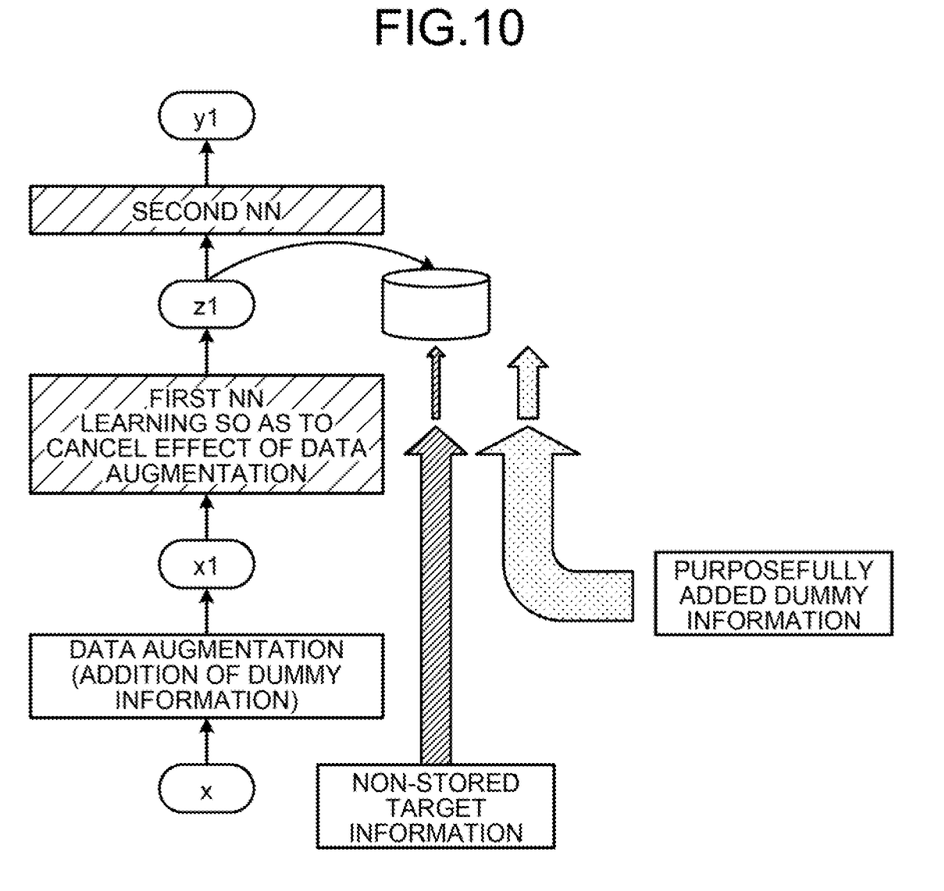
FIG. 10 is a diagram that illustrates an advantageous effect of the learning apparatus according to the present embodiment.

Next, an advantageous effect of the learning apparatus 100 according to the present embodiment is described. FIG. 10 is a diagram that illustrates an advantageous effect of the learning apparatus according to the present embodiment. The learning apparatus 100 executes data augmentation by adding the dummy information similar to the non-stored target information to the original training data to generate a plurality of sets of training data. The learning apparatus learns the parameter of the deep learning model and the reference feature value such that the intermediate feature values of the sets of training data become similar to the reference feature value and the output label becomes close to the correct label. This learning cancels the effect of the data augmentation and, in accordance with the progression of the learning, the non-stored target information is reduced in the reference feature value. This prevents inappropriate information from remaining when the reference feature value is continuously used for the subsequent sequential learning.

As the learning apparatus 100 executes data augmentation by generating dummy information based on the non-stored target information with which an individual person is identifiable and by adding the dummy information to the original training data, it is possible to easily execute learning so as to cancel the effect of the dummy information. Furthermore, the information leakage risk may be reduced.

The learning apparatus 100 repeatedly executes sequential learning by using the pair of the reference feature value included in the reference feature value database 144 and the correct label. The reference feature value is learned so as not to include the non-stored target information; therefore, even though sequential learning is repeatedly performed, the non-stored target information on each customer may be prevented from remaining in the reference feature value.

Figure 11:
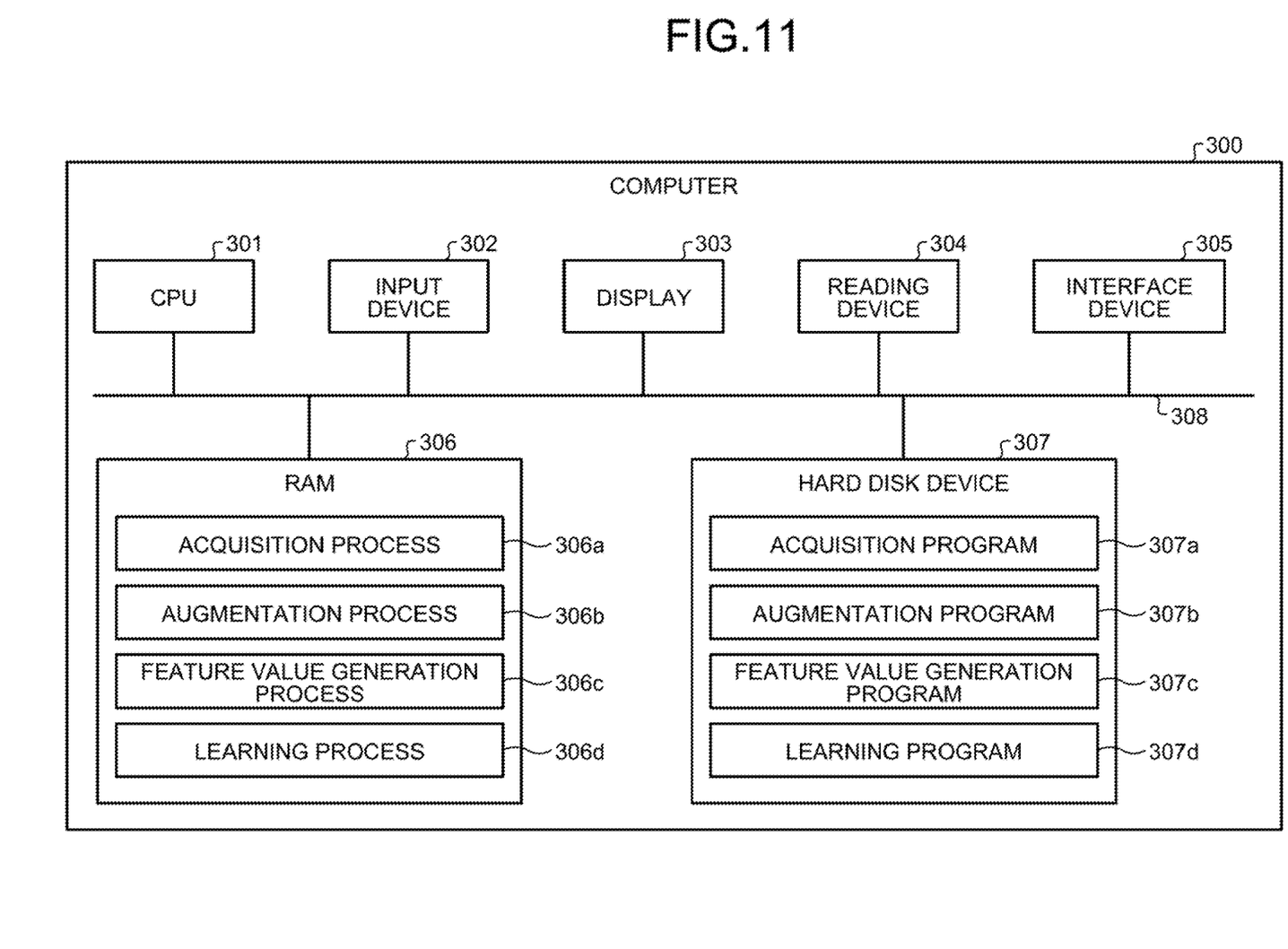
FIG. 11 is a diagram that illustrates an example of the hardware configuration of a computer that performs the same function as that of the learning apparatus according to the present embodiment.

Next, an example of the hardware configuration of a computer that performs the same function as that of the learning apparatus 100 described according to the present embodiment is described. FIG. 11 is a diagram that illustrates an example of the hardware configuration of the computer that performs the same function as that of the learning apparatus according to the present embodiment.

As illustrated in FIG. 11, a computer 300 includes: a CPU 301 that performs various types of arithmetic processing; an input device 302 that receives an input of data from the user; and a display 303. The computer 300 further includes: a reading device 304 that reads programs, and the like, from a storage medium; and an interface device 305 that communicates data with an external device, or the like, via a wired or wireless network. The computer 300 includes: a RAM 306 that temporarily stores various types of information; and a hard disk device 307. Each of the devices 301 to 307 is connected to a bus 308.

The hard disk device 307 includes an acquisition program 307a, an augmentation program 307b, a feature value generation program 307c, and a learning program 307d. The CPU 301 reads the acquisition program 307a, the augmentation program 307b, the feature value generation program 307c, and the learning program 307d and loads them into the RAM 306.

The acquisition program 307a functions as an acquisition process 306a. The augmentation program 307b functions as an augmentation process 306b. The feature value generation program 307c functions as a feature value generation process 306c. The learning program 307d functions as a learning process 306d.

A process of the acquisition process 306a corresponds to a process of the acquisition unit 150a. A process of the augmentation process 306b corresponds to a process of the augmentation unit 150b. A process of the feature value generation process 306c corresponds to a process of the feature value generation unit 150c. A process of the learning process 306d corresponds to a process of the learning unit 150d.

Each of the programs 307a to 307d does not always need to be initially stored in the hard disk device 307. For example, each program is stored in a "portable physical medium", such as a flexible disk (FD), CD-ROM, DVD disk, magnet-optical disk, or IC card, which is inserted into the computer 300. The computer 300 reads and executes each of the programs 307a to 307d.

It is possible to prevent inappropriate information from remaining in the information that is continuously used for the subsequent learning.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A learning method executed by a computer, the learning method comprising:

augmenting Original training data based on non-stored target information included in the Original training data to generate a plurality of augmented training data;

generating a plurality of intermediate feature values being outputs of an intermediate layer by inputting the plurality of augmented training data to a deep learning model; and learning a parameter of the deep learning model such that, with regard to the plurality of intermediate feature values, each of the plurality of intermediate feature values being outputs of an intermediate layer of the deep learning model corresponding to a plurality of augmented training data, becomes similar to a reference feature value, wherein the generating the augmented training data includes generating dummy information based on the non-stored target information and adding the generated dummy information to the Original training data to generate the augmented training data, the non-stored target information is information with which an individual person is identifiable, and the generating the augmented training data includes generating, as the dummy information, information similar to the information with which the individual person is identifiable.

2. The learning method according to claim 1, further including storing a learned reference feature value and correct information corresponding to Original training data in a related manner.

3. A non-transitory computer-readable recording medium storing therein a learning program that causes a computer to execute a process comprising:

augmenting Original training data based on non-stored target information included in the Original training data to generate a plurality of augmented training data;

generating a plurality of intermediate feature values being outputs of an intermediate layer by inputting the plurality of augmented training data to a deep learning model; and learning a parameter of the deep learning model such that, with regard to the plurality of intermediate feature values, each of the plurality of intermediate feature values being outputs of the intermediate layer of the deep learning model corresponding to a plurality of augmented training data, augmented from reference training data, becomes similar to a reference feature value, wherein the generating the augmented training data generates dummy information based on the non-stored target information and adds the generated dummy information to the Original training data to generate the augmented training data, the non-stored target information is information with which an individual person is identifiable, and the generating the augmented training data generates, as the dummy information, information similar to the information with which the individual person is identifiable.

4. The non-transitory computer-readable recording medium according to claim 3, further including storing a learned reference feature value and correct information corresponding to Original training data in a related manner.

5. A learning apparatus comprising:

a processor configured to:

augment Original training data based on non-stored target information included in the Original training data to generate a plurality of augmented training data;

generate a plurality of intermediate feature values being outputs of an intermediate layer by inputting the plurality of augmented training data to a deep learning model; and learn a parameter of the deep learning model such that, with regard to the plurality of intermediate feature values, each of the plurality of intermediate feature values being outputs of the intermediate layer of the deep learning model corresponding to a plurality of augmented training data, augmented from reference training data, becomes similar to a reference feature value, wherein the processor is further configured to generate dummy information based on the non-stored target information and add the generated dummy information to the Original training data to generate the augmented training data, the non-stored target information is information with which an individual person is identifiable, and the processor is further configured to generate, as the dummy information, information similar to the information with which the individual person is identifiable.

6. The learning apparatus according to claim 5, wherein the processor is further configured to store a learned reference feature value and correct information corresponding to Original training data in a related manner.

* * * * *